United States Patent Office 3,448,074
Patented June 3, 1969

3,448,074
POLYOLEFINS STABILIZED WITH SUBSTITUTED 4-OXOIMIDAZOLIDINE-1-OXIDES
Atsushi Kitaoka, Nobeoka, and Keisuke Murayama, Syoji Morimura, Toshimasa Toda, Saburo Akagi, Tomoyuki Kurumada, and Ichiro Watanabe, Tokyo, Japan, assignors to Sankyo Company Limited, Tokyo, Japan, and Asahi Kasei Kogyo Kabushiki Kaisha, Osaka, Osaka Prefecture, Japan
No Drawing. Filed Aug. 28, 1967, Ser. No. 663,492
Claims priority, application Japan, Aug. 31, 1966, 41/57,420
Int. Cl. C08f *45/60, 29/00;* C08g *51/60*
U.S. Cl. 260—45.8      6 Claims

ABSTRACT OF THE DISCLOSURE

Polyolefins, particularly polyethylene and polypropylene, are stabilized against photo-deterioration under the exposure to light by having incorporated therein at least one compound selected from the 2,2,5,5,-tetrasubstituted-4-oxoimidazolidine-1-oxides in a sufficient amount to inhibit such deterioration.

---

This invention relates to the stabilization of polyolefin. More particularly, it relates to the stabilization of polyolefin against deterioration resulting from exposure to light with imidazolidine-N-oxides. Still more particularly, it is concerned with the stabilization of polyolefin against such photo-deterioration with the imidazolidine-N-oxides having the formula

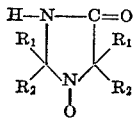

(I)

wherein $R_1$ and $R_2$, which may be the same or different, represent alkyl group or they may be linked together with the carbon atom to which they are attached to form a saturated 5- or 6-membered homocyclic ring which may be substituted with alkyl group or the group of the formula

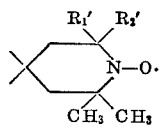

(wherein $R_1'$ and $R_2'$, which may be the same or different, represent alkyl group).

Polyolefins are frequently subjected to photo-deterioration when exposed to light such as sunlight or ultraviolet light. For the purpose of stabilizing polyolefins against such deterioration, there have been proposed in the art a great number of light stabilizers, especially such light stabilizers as "Tinuvin P" (the trade name of the light stabilizer containing as active ingredient 2-(2-'-hydroxy-5'-methyl)-phenylbenzotriazole) and 2,4-dihydroxybenzophenone. These prior art stabilizers are, however, not satisfactorily effective in the inhibition of deterioration of the polyolefin, especially when employed under the outdoor exposure to sunlight. Thus, the development of the more effective stabilizers would be desired in the art.

As a result of our investigations on light stabilizers, it has been unexpectedly found that the above-mentioned imidazolidine-N-oxides (I) exhibit an exceptionally high degree of light stability against deterioration of polyolefin, accompanied with little thermal sublimation and without a substantially unfavourable level of coloring action on polyolefin.

It is, accordingly, an object of this invention to provide the new stabilizers for polyolefins against deterioration resulting from exposure to light.

It is another object of this invention to provide polyolefins stabilized against deterioration under the action of light with the above-mentioned imidazolidine-N-oxides (I).

Still another object of this invention is to provide an improved process for stabilizing polyolefins against deterioration by light which comprises incorporation of the above-mentioned imidazolidine-N-oxides (I) into the polyolefins.

These and other objects and advantages of this invention will appear in the more detailed description of this invention which follows.

The term "polyolefin" as used herein is intended to include high or low pressure polyethylene, polypropylene, other polyolefins, for example, polybutadiene, polyisoprene and the like and various olefin copolymers, for example, ethylene-propylene copolymers, styrene-butadiene copolymers, acrylonitrile-butadiene-styrene copolymers and the like.

The imidazolidine-N-oxides (I) in this invention are novel compounds unknown in the prior art. Novel imidazolidine-N-oxides (I) may be readily and advantageously obtained by the process which comprises reacting the ketone compounds having the formula

(II)

wherein $R_1$ and $R_2$ are as defined above with a suitable ammonium salt and a suitable alkali (or alkaline earth) metal cyanide to form the corresponding aminonitrile compound having the formula

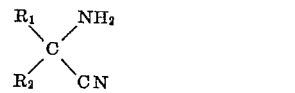

(III)

wherein $R_1$ and $R_2$ are as defined above followed by reaction of the latter Compound III with a suitable alcoholate or hydroxide of alkali (or alkaline earth) metal to form the imidazolidine compounds having the formula

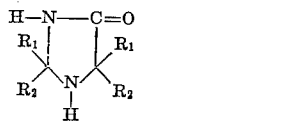

(IV)

wherein $R_1$ and $R_2$ are as defined above, according to the known procedure disclosed by W. E. Noland et al. in the Journal of Organic Chemistry 28, 3576 (1963), and then treating the imidazolidine Compounds IV thus obtained with a peroxide.

In the above Formula I, each of the $R_1$ and $R_2$ may be illustratively represented by the following groups; methyl, ethyl, n-propyl, isopropyl, n-butyl, isobutyl, hexyl, octyl, decyl and dodecyl. The cyclic groups formed by the $R_1$ and $R_2$ may be illustratively represented by the following groups;

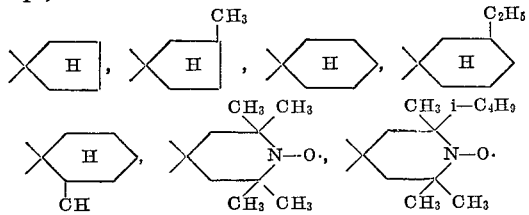

Representative examples of the imidazolidine-N-oxides (I) employed in this invention include the following imidazolidine-N-oxides;

cyclohexane-1-spiro-2'-(4'-oxoimidazolidine-1'-oxide)-5'-spiro-1''-cyclohexane (M.P. 227–228° C.), 2,2,5,5-tetramethyl-4-oxoimidazolidine-1-oxide (M.P. 225–226° C.), (2,2,6,6-tetramethyl-piperidine-1-oxide)-4-spiro-2'-(4'-oxoimidazolidine-1'-oxide)-5'-spiro-4''-(2'',2'',6'',6''-tetramethyl-piperidine-1''-oxide) (M.P. 215–217° C.)

2,5-dimethyl-2,5-diethyl-4-oxoimidazolidine-1-oxide (M.P. 114–115° C.), and 1-methylcyclohexane-2-spiro-2'-(4'-oxoimidazolidine-1'-oxide)-5'-spiro-2''-(1''-methylcyclohexane) (M.P. 174–175° C.).

Where the imidazolidine-N-oxides of the above-mentioned Formula I are to be employed in polyolefin for the purpose of stabilization, they may be incorporated or blended into polyolefin by any of the conventional methods commonly used for incorporating or blending commercially available stabilizers such as antioxidants into the polyolefin. The stabilizers of this invention may be incorporated or blended into polyolefin at any desired stage prior to the preparation of shaped articles.

The amount of the imidazolidine-N-oxide to be employed in the polyolefin in accordance with this invention can be widely varied, depending upon the properties and particular use of the stabilized polyolefin and other factors, but generally it is preferred to employ the imidazolidine-N-oxide (I) in the range of concentrations of above 0.05–2% by weight, most preferably concentrations of about 0.1–1% by weight, these concentrations being based upon the weight of the polyolefin employed.

Other additives commonly used in the art, including other known antioxidants and ultraviolet absorbants, may be optionally utilized together with the imidazolidine-N-oxides (I) in this invention. If necessary, an optional combination of two or more imidazolidine-N-oxides may be satisfactorily employed in this invention in order to achieve the better results.

The following non-limiting examples are given only for the purpose of illustrating the excellent light resistance of the imidazolidine-N-oxides (I) in the polyolefin in accordance with this invention.

All parts are given by weight unless otherwise indicated.

Example 1

With 100 parts of polypropylene in a mortar was intimately admixtured 0.25 part of the novel stabilizer of this invention selected from those indicated in the following Table I.

The resulting mixture was preheated to 215° C. under a pressure of 10 kg./cm.² for 2 minutes, and then compression-molded into a sheet of 0.5 mm. thick under the following condition, i.e. at 215° C. under a pressure of 150 kg./cm² for 0.5 minute.

As a control, the polypropylene sheets were prepared in a similar manner to that described above with the commercially available stabilizer indicated in the following Table I or without any of such stabilizers, for comparative purpose.

Then, all of these sheets thus formed were tested for the brittleness time (which means the time, expressed in terms of hour, until the test sheet will become brittle) under ultraviolet irradiation at a temperature of 45° C. by means of the fade meter prescribed in the JIS-L-1044-3-8.

The test results are listed in the following Table I.

TABLE I

| Stabilizer | Brittleness time (hour) |
|---|---|
| Imidazolidine-N-oxide of this invention: | |
| Cyclohexane-1-spiro-2'-(4'-oxoimidazolidine-1'-oxide)-5-spiro-1''-cyclohexane | 380 |
| 2,2,5,5-tetramethyl-4-oxoimidazolidine-1-oxide | 360 |
| 2,5-dimethyl-2,5-diisobutyl-4-oxoimidazolidine-1-oxide | 340 |
| (2,2,6,6-tetramethyl-piperidine-1-oxide)-4-spiro-2'-(4'-oxoimidazolidine-1'-oxide)-5'-spiro-4''-(2'',2'',6'',6''-tetramethyl-piperidine-1''-oxide) | 400 |
| 2,5-dimethyl-2,5-diethyl-4-oxoimidazolidine-1-oxide | 360 |
| 1-methylcyclohexane-2-spiro-2'-(4'-oxoimidazolidine-1'-oxide)-5'-spiro-2''-(1''-methylcyclohexane) | 420 |
| Commercially available stabilizer: | |
| Tinuvin P | 80 |
| 2,2'-dihydroxy-3,3'-di-tert.-butyl-5,5'-dimethyldiphenyl methane | 100 |
| None | 40 |

From the foregoing results it will be apparent that the imidazolidine-N-oxides (I) of this invention exhibit superior stabilizing effect in preventing polyolefin, especially polypropylene, from the deterioration under the exposure to light, as compared with known light stabilizers.

Example 2

An intimately admixtured polymer stock composed of 100 parts of high density polyethylene (low pressure process polyethylene) having a density of 0.958 and a melt index of 2 and 0.25 part of the novel stabilizer of this invention selected from those indicated in the following Table II, was prepared in a mortar.

The polymer stock thus obtained was preheated to 200° C. under a pressure of 10 kg./cm.² for 1 minute and then compression-molded into a sheet of 0.5 mm. thick under the following condition, i.e., at 180° C. under a pressure of 200 kg./cm.² for 0.5 minute.

As a control, the polyethylene sheets were prepared in a similar manner to that described above with the commercially available stabilizer indicated in the Table II or without any of such stabilizers, for comparative purpose.

Then, all of these sheets thus formed were tested for the "brittleness time" with the same testing procedure and condition as described in the Example 1.

The test results are listed in the following Table II.

TABLE II

| Stabilizer | Brittleness time (hour) |
|---|---|
| Imidazolidine-N-oxide of this invention: | |
| Cyclohexane-1-spiro-2'-(4'-oxoimidazolidine-1'-oxide)-5'-spiro-1''-cyclohexane | 1,080 |
| 2,2,5,5-tetramethyl-4-oxoimidazolidine-1-oxide | 960 |
| Commercially available stabilizer: | |
| Tinuvin P | 360 |
| 2,6-di-tert.-butyl-4-methyl phenol (commonly referred to as "BHT") | 300 |
| None | 300 |

From the foregoing results it will be apparent that the imidazolidine-N-oxides (I) of this invention exhibit superior stabilizing effect in preventing polyolefin, especially polyethylene, from the deterioration under the exposure to light, as compared with known light stabilizer.

What is claimed is:

1. Polyolefin stabilized against deterioration by light wherein there is incorporated, in a sufficient amount to inhibit the deterioration, a compound having the formula

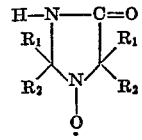

wherein $R_1$ and $R_2$, which may be the same or different, represent alkyl group or they may be linked together with the carbon atom to which they are attached to form a saturated 5- or 6-membered homocyclic ring which may be substituted with alkyl group or the group of the formula

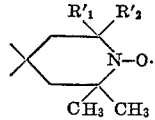

wherein $R'_1$ and $R'_2$, which may be the same or different, represent an alkyl group.

2. Polyolefin according to claim 1 wherein there is incorporated an amount of 0.05–2% by weight of a compound selected from the group consisting of:
 cyclohexane-1-spiro-2'-(4' - oxoimidazolidine-1'-oxide)-5'-spiro-1''-cyclohexane;
 2,2,5,5-tetramethyl-4-oxoimidazolidine-1-oxide;
 2,5-dimethyl-2,5-diisobutyl-4-oxoimidazolidine-1-oxide;
 (2,2,6,6-tetramethylpiperidine - 1 - oxide-4-spiro-2'-(4'-oxoimidazolidine-1'-oxide) - 5' - spiro-4''-(2'',2'',6'',6''-tetramethylpiperidine-1''-oxide);
 2,5-dimethyl-2,5-diethyl - 4 - oxoimidazolidine-1-oxide; and
 1-methylcyclohexane - 2 - spiro-2'-(4'-oxoimidazolidine-1'-oxide)-5'-spiro-2''-(1''-methylcyclohexane).

3. Polyethylene stabilized against deterioration by light wherein there is incorporated, in a sufficient amount to inhibit the deterioration, a compound having the formula

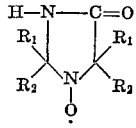

wherein $R_1$ and $R_2$, which may be the same or different, represent alkyl group or they may be linked together with the carbon atom to which they are attached to form a saturated 5- or 6-membered homocyclic ring which may be substituted with alkyl group or the group of the formula

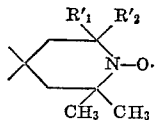

wherein $R'_1$ and $R'_2$, which may be the same or different, represent an alkyl group.

4. Polyethylene according to claim 3 wherein there is incorporated an amount of 0.05–2% by weight of a compound selected from the group consisting of:
 cyclohexane-1-spiro-2'-(4' - oxoimidazolidine-1'-oxide)-5'-spiro-1''-cyclohexane;
 2,2,5,5-tetramethyl-4-oxoimidazolidine-1-oxide;
 (2,2,6,6 - tetramethylpiperidine-1-oxide)-4-spiro-2'-(4''-oxoimidazolidine-1'-oxide) - 5 - spiro-4''-(2'',2'',6'',6''-tetramethylpiperidine-1''-oxide);
 2,5-dimethyl-2,5-diethyl - 4 - oxoimidazolidine-1-oxide; and
 1-methylcyclohexane - 2 - spiro-2'-(4'-oxoimidazolidine-1'-oxide)-5'-spiro-2''-(1''-methylcyclohexane).

5. Polypropylene stabilized against deterioration by light wherein there is incorporated, in a sufficient amount to inhibit the deterioration, a compound having the formula

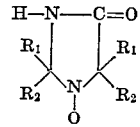

wherein $R_1$ and $R_2$, which may be the same or different, represent alkyl group or they may be linked together with the carbon atom to which they are attached to form a saturated 5- or 6- member homocyclic ring which may be substituted with alkyl group or the group of the formula

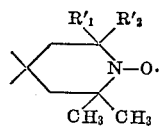

wherein $R'_1$ and $R'_2$, which may be the same or different, represent an alkyl group.

6. Polypropylene according to claim 5 wherein there is incorporated an amount of 0.05–2% by weight of a compound selected from the group consisting of:
 cyclohexane-1-spiro-2'-(4' - oxoimidazolidine-1'-oxide)-5'-spiro-1''-cyclohexane;
 2,2,5,5-tetramethyl-4-oxoimidazolidine-1-oxide;
 2,5-dimethyl-2,5-diisobutyl-4-oxoimidazolidine-1-oxide;
 (2,2,6,6 - tetramethylpiperidine-1-oxide)-4-spiro-2'-(4'-oxoimidazolidine - 1' - oxide)-5'-spiro-4''-(2'',2'',6'',6''-tetramethylpiperidine-1''-oxide);
 2,5-dimethyl-2,5-diethyl - 4 - oxoimidazolidine-1-oxide; and
 1-methylcyclohexane - 2 - spiro-2'-(4'-oxoimidazolidine-1'-oxide)-5'-spiro-2''-(1''-methylcyclohexane).

References Cited
UNITED STATES PATENTS

| | | | |
|---|---|---|---|
| 3,325,445 | 6/1967 | Harris et al. | 260—45.8 |
| 3,325,499 | 6/1967 | Poos | 260—294 |
| 3,334,103 | 8/1967 | Feldman et al. | 260—290 |

DONALD E. CZAJA, *Primary Examiner.*

R. A. WHITE, *Assistant Examiner.*

U.S. Cl. X.R.

260—45.95, 294, 309.7